US005774363A

United States Patent [19]

Sato et al.

[11] Patent Number: 5,774,363

[45] Date of Patent: Jun. 30, 1998

[54] PAGE ARRANGEMENT ORDER DETERMINATION METHOD

[75] Inventors: Hajime Sato; Masakatsu Yanaga; Keisuke Iguchi; Norio Kajima; Yasu Sato, all of Tokyo, Japan

[73] Assignee: Mitsubishi Paper Mills Limited, Tokyo, Japan

[21] Appl. No.: 484,330

[22] Filed: Jun. 7, 1995

Related U.S. Application Data

[63] Continuation-in-part of Ser. No. 77,519, Jun. 17, 1993, abandoned.

[30] Foreign Application Priority Data

| | | | |
|---|---|---|---|
| Jun. 18, 1992 | [JP] | Japan | 4-184370 |
| Jun. 18, 1992 | [JP] | Japan | 4-184371 |

[51] Int. Cl.$^{6}$ .......... G06F 19/00

[52] U.S. Cl. .......... 364/468.03; 364/478.07; 412/1; 355/77

[58] Field of Search .......... 364/468.03, 419.01, 364/478.07; 395/117, 148, 792; 355/77, 24, 319, 75; 412/1; 281/16, 15.1; 270/1.01–22.1

[56] References Cited

U.S. PATENT DOCUMENTS

| | | | |
|---|---|---|---|
| 3,920,267 | 11/1975 | Lyon, Jr. | 281/16 |
| 3,982,743 | 9/1976 | DeRoo, Sr. | 270/1 |
| 4,520,454 | 5/1985 | Dufour et al. | 395/117 |
| 4,586,640 | 5/1986 | Smith | 227/14 |
| 4,789,147 | 12/1988 | Berger et al. | 395/117 |
| 4,814,822 | 3/1989 | Acquaviva et al. | 355/319 |
| 5,095,330 | 3/1992 | Nishida et al. | 355/77 |
| 5,133,051 | 7/1992 | Handley | 395/148 |
| 5,140,380 | 8/1992 | Nakamura et al. | 355/324 |
| 5,144,562 | 9/1992 | Stikkelorum et al. | 364/478 |
| 5,170,467 | 12/1992 | Kubota et al. | 395/148 |
| 5,177,548 | 1/1993 | Nakamura et al. | 355/324 |
| 5,241,474 | 8/1993 | Marovac | 355/77 |
| 5,250,985 | 10/1993 | Ishii et al. | 355/206 |

FOREIGN PATENT DOCUMENTS

| | | | |
|---|---|---|---|
| 345941 | 2/1991 | Japan | G03B 27/32 |

OTHER PUBLICATIONS

Patent Abstracts of Japan, vol. 015, No. 192 (P–1202), May 1991 re: JP 03 045941 A.

*Primary Examiner*—Reba I. Elmore
*Assistant Examiner*—Steven R. Garland
*Attorney, Agent, or Firm*—Cushman Darby & Cushman IP Group of Pillsbury Madison & Sutro LLP

[57] ABSTRACT

In a page arrangement order determination method, when a plurality of pages are to be arranged on a common surface for printing purposes, the order of arrangement of the plurality of pages on the common surface is determined based on only the order of folding of printed paper and a position of a front page. A cutting step required for a work-and-tumble operation and a repeat operation can be effected between a printing step and a bookbinding step, and when one of the work-and-tumble operation and the repeat operation is to be effected, the page arrangement order is determined only by additionally designating the one of the two operations.

4 Claims, 18 Drawing Sheets

POSITION ORDER

PAGE ORDER FOR FRONT PLATE

PAGE ORDER FOR BACK PLATE

ARRANGEMENT FOR BACK PLATE

ARRANGEMENT FOR FRONT PLATE

POSITION ORDER

PAGE ORDER FOR WORK AND TUMBLE

PAGE ORDER FOR REPEAT FOR FRONT PLATE

PAGE ORDER FOR REPEAT FOR BACK PLATE

PAGE ARRANGEMENT ORDER DETERMINATION METHOD

CROSS REFERENCE TO RELATED APPLICATION

This is a continuation-in-part of patent application Ser. No. 08/077,519 filed on Jun. 17, 1993, now abandoned, the content of which is herein incorporated by reference.

BACKGROUND OF THE INVENTION

1. Field of the Invention

This invention relates to a method of determining the order of arrangement of a plurality of pages on a common surface of a machine plate (or press plate) used for printing publications, or in the process of preparing such a machine plate.

2. Description of the Related Art

A general procedure for making a publication will be briefly described below with reference to FIG. 1. First, a planning meeting or conference 101 takes place where the constitution or arrangement of items, preparation of a table indicating page numbers of a printed matter while classifying the printed matter into respective signatures, preparation of a schedule list, an so on are decided. In a copy request data-collection step 102, copies, such as characters, illustrations and the like are secured. Layout design is decided for each page, depending on a copy adjustment or boarding layout step 103, and complete copies are prepared in a complete copy preparation step 104. Next, a plate preparation step 105 is performed. A machine plate (or printing plate) is completed in a rough plate step 107 through proofreading in step 106. Then, the procedure proceeds through a printing step 108, a bookbinding step 109, and a delivering step 110. Usually, printing images are printed onto printing paper of a size that can be handled by a printing machine. In this case, since a printed publication (or printed matter) is smaller in size than the printing paper, a plurality of pages are printed on one side or surface of the printing paper at the same time. Therefore, images of the copies of a plurality of pages are first formed or reproduced on a single machine plate. The printed matter thus printed by this machine plate is formed into a so-called page-style printed publication through the bookbinding step 109.

In the bookbinding step 109, there are the following steps:

(1) Each printing paper is folded a predetermined number of times in accordance with a predetermined procedure.

(2) The printing papers are stitched and combined together at a predetermined edge or side.

(3) The printed papers thus combined are cut along the other three sides.

The printed papers thus combined must meet the following requirements:

(1) The pages need to be arranged in a predetermined sequence or order.

(2) The pages need to be oriented in the same direction.

The pages must be so arranged, positioned and oriented on a single plate that these requirements can be satisfied. However, there are a great number of possible patterns for arranging the pages on the machine plate, depending on the size of the plate, the number of folds of the printing paper, the method of folding the printing paper, the size of the pages, the manner of stitching, the size of a gripper margin of the machine plate to be gripped by the printing machine, and so on. An operation in which the pages are arranged on the machine plate (that is, images of copies of the pages are reproduced on the machine plate) in a manner to satisfy these requirements is called "arrangement of pages on a machine plate" (hereinafter often referred to as "page arrangement-on-machine plate method").

One example of a bookbinding (called "ordinary bookbinding) process for preparing a page-style book will be briefly described below with reference to FIG. 2, based on printing paper printed by a machine plate on which pages are arranged in accordance with the above page arrangement-on-machine plate method.

First, edges of printing papers 111, each having a plurality of pages printed on its front and back surfaces in a predetermined order, are trued up by an edge true-up machine 112 (FIG. 2A). Then, the printing papers are cut b a cutter 113 (FIG. 2B), if necessary. Then, the printing papers are classified in accordance with the required number of folds, and the printing papers are folded (FIG. 2C). The printing paper thus folded in this folding operation is called "a section (or signature)" 116. The signatures of different kinds are arranged or gathered in a predetermined order, and this operation is called "a signature gathering operation". This operation is carried out by a gathering machine (FIG. 2D). More specifically, first, the signatures of each kind are put into a stack, and these stacks of signatures 117, 118, 119 and 120 are set on the gathering machine, and the signatures of different kinds are sequentially stacked one upon another as at 121 to 124. Then, the signatures thus arranged in the predetermined order are stitched or bound at their one edges by a thread so that they will not separate from each other, and then a cover is applied to the thus combined signatures, and the other three sides or edges than the stitched edges are cut for finishing purposes by a cutter 126 (FIG. 2E).

When a plurality of pages are to be arranged on a single machine plate, the number of the pages is called "the number of the pages arranged on the machine plate". There are occasions when a total number of pages of a publication to be printed can not be divided by the number of pages to be arranged on a single machine plate. In such a case, if the printing is effected using an ordinary page arrangement-on-machine plate method, those pages corresponding to the remainder of the division remain blank, so that the resulting printed publication has a poor style and printing paper is wasted. In such a case, this disadvantage can be overcome by using page arrangement-on-machine plate methods called "work and tumble" and "repeat" as will be described later.

The size of printing paper handled by the folding machine is often smaller than the size of printing paper handled by the printing machine. In such a case, usually, the printed paper is cut into two or four, and then is folded by the folding machine. The ordinary page arrangement-on-machine plate method which does not take such cutting (or division) into consideration can not be used in this case; however, even in such a case, "work and tumble" and "repeat" as will be described later can be used.

In the ordinary page arrangement-on-machine plate method, it is necessary to prepare machine plates (front plates) for respectively printing front surfaces of printing papers and machine plates (back plates) for respectively printing back surfaces of the printing papers. Thus, a set of front and back plates are required. In such an ordinary case, the pages arranged on the front plate are usually different from the pages arranged on the rear plate. However, in the case where the printed paper is cut, and then is folded by the folding machine, the arrangement of the pages on the front plate can be the same as the arrangement of the pages on the back plate. In such a case, front and back surfaces of printing paper can be printed by a single machine plate. Such a page arrangement-on-machine plate method is called “work and tumble” or “work and turn”.

In the ordinary page arrangement-on-machine plate method, since the pages arranged on the front plate are different from the pages arranged on the back plate, the number of the pages arranged per set of front and back plates is twice the number of the pages arranged on the single machine plate. In the case of the work and tumble, since the pages on the front plate are the same as the pages on the back plate, the number of the pages arranged per set of front and back plates is equal to the number of the pages arranged on the single machine plate.

Therefore, if a total number of a publication to be printed can not be divided by the number of pages per set of front and back plates, the page arrangement-on-machine plate method depending on the work and tumble can be used, thereby saving printing paper and the machine plate.

Reference is now made to a specific example in which a A5-size (148×210 mm) book of the saddle stitch type having a total page number of 56 is formed using a printing machine (which is capable of printing paper of up to a size of 650×550 mm) and a folding machine capable of dealing with printing paper of up to the same size. Since printing paper used in the printing machine is larger in size than the book, a method in which a plurality of pages are printed on the printing paper at a time is used, and then the printed paper is folded, and then bookbinding is effected. The folding machine usually folds the printing paper in two, and therefore the number of pages to be printed on the printing page is represented by $2^n$ (n=1, 2, 3 . . . ). In this case, in view of the size of the book and the size of the printing paper which can be printed by the printing machine, the pages are arranged such that the number of the pages in each row is four while the number of pages in each column is two, as shown in FIG. 3. Therefore, a page arrangement of layout data for the machine plate is decided in the same manner.

Then, a page arrangement order is determined as layout data of the machine plate so that when the printed paper is folded by the folding machine and when the pages are placed one upon another, the pages are arranged in proper order. The manner of folding the paper in this case is shown in FIG. 4. More specifically, the paper (FIG. 4A) is folded in two to bring a right half (portions C, D, G and H) into underlying relation to a left half (portions A, B, E and F). Then, the folded paper (FIG. 4B) is again folded in two to bring a lower half (portions E, F, G and H) into underlying relation to an upper half (portions A, B, C and D). Then, the twice-folded paper (FIG. 4C) is further folded in two to bring a left half (portions A, D, E and H) into underlying relation to a right half (portions B, C, F and G). In this condition shown in FIG. 4D, the opposite outermost portions of the thus folded paper have the areas A and B, respectively, and the outermost portion having the area B is the front page.

Irrespective of the side (that is, the front and back surfaces) of the printing paper, the order of arrangement of the positions (portions) of the printing paper one upon another will hereinafter be referred to as “position order”. The order of printing of the pages (i.e., images of copies of the pages) on these positions, taking the front and back surfaces into consideration, will hereinafter be referred to as “page order”.

On the assumption that the pages are arranged in the predetermined order, “the position order” is determined as shown in FIG. 5A. If the 1st page is on the front surface of the printing paper, the 2nd page is usually on the back surface thereof. The 3rd page, facing the 2nd page upon folding, is on the same surface as the 2nd page is. In other words, the order of arrangement of the pages on the front and back surfaces is “front”→“back”→“back”→“front”, . . . , and this arrangement is repeated. Therefore, page 1, page 4, page 5, page 8, . . . are printed on the front surface while page 2, page 3, page 6, page 7 . . . are printed on the back surface. The same page arrangement is made with respect to the machine plate for printing images of copies of the pages onto the printing paper, and “the page order” for the front machine plate is as shown in FIG. 5B, and “the page order” for the back machine plate is as shown in FIG. 5C.

Generally, for determining “the page order”, paper is actually folded in a predetermined manner, and then pages are allocated to the folded paper, and then the folded paper is expanded flat for confirmation purposes. Another method is to automatically determine this page arrangement using a computer. In this method, the position and direction of folding of the printed paper are designated for each folding operation, thereby determining the order of superposition of the pages.

A procedure for automatically determining the page order will now be described with reference to FIGS. 4A–4D. First, a folding position 144 is designated, and also a direction 145 of this folding is designated. As a result of folding, the printing paper is formed into a condition shown in FIG. 4B. Then, a subsequent folding position 146 as well as a folding direction 147 is designated, and the paper is further folded into a condition shown in FIG. 4C. Then, a subsequent folding position 148 as well as a folding direction 149 is designated, and at this stage the designation of the folding operations is finished, and the folded paper is in a condition shown in FIG. 4D. Finally, page B, appearing on the front side of the folded paper together with page A, is designated as a front page, so that the page order can be determined. This procedure is shown in a block diagram of FIG. 18.

In this case, both the folding order and the folding directions must be input correctly. However, if the operator is unfamiliar with how the folding machine effects the folding, data can not be properly entered into the computer, and this operation is rather complicated, and causes mistakes.

After “the page order” for the front machine plate and “the page order” for the back machine plate are determined as shown in FIGS. 5B and 5C, respectively, it is determined based on “these page orders” how 56 pages are arranged on the machine plates. A pair of machine plates for respectively printing front and back surfaces of one or common printing paper, respectively, are called “a set of front and back plates”. In this case where 8 pages are printed on each surface of the printing paper, 16 pages are printed per one set of front and back plates, and therefore four sets of front and back plates are required for printing 56 pages. The pages (that is, images of copies of the pages) are arranged on a first set of machine plates (front and back plates) in accordance with “the page order” (FIGS. 5B–5C) of the layout data, starting from page 1 (FIGS. 7A and 7B). The pages are arranged on a second set of machine plates in accordance with “the page order” of FIGS. 5B–5C, starting from page 17 (FIGS. 7C and 7D). The pages are arranged in a similar manner with respect to a third set and a fourth set (FIGS. 7E and 7F and FIGS. 7G and 7H).

The printing is effected using these machine plates in which the respective page arrangements have been made, and each printed paper is folded in a predetermined manner, so that the pages of the folded paper are arranged in a predetermined order. This folded paper is called “a signature or section”. The signatures are stacked one upon another, and are bound to make a printed publication or book.

Blank portions where no page is arranged are present respectively at opposite side portions of each of the fourth set of machine plates as shown in FIGS. 7G and 7H. When the printing is carried out using these machine plates, and the bookbinding is effected, those portions of the printed paper corresponding to these blank portions are wasted. Therefore, with respect to the fourth set of machine plates, the printed paper is cut into two portions, and each of the two portions is folded twice to form a signature, and this signature is stacked on the signatures formed using the first to third sets of machine plates, thereby making the 56-page book. In this case, "the page order" of the fourth machine plate is as shown in FIG. 8. Opposite side or surfaces of printing paper are printed by this machine plate (in which case the front surface is printed, and then the machine plate is turned over in a right-left direction, and then the back surface is printed). The thus printed paper is cut into two portions along a cutting (or division) line 184. The two portions, cut off form each other along the cutting line 184, have the same page arrangement except that the printed surfaces of one of the two portions are reversed with respect to the printing surfaces of the other. Each of the two portions are folded to form the signature, and this signature is stacked on the other signatures to thereby provide the 56-page book.

"The page order" of the fourth machine plate is different from that of the first to third sets of machine plates determined in accordance with the ordinary page arrangement pattern. For determining this arrangement order of the fourth machine plate, paper is cut into two portions, and then the two portions are actually folded, and then pages are allocated to the folded portions, thereby determining the arrangement order. Another method is to designate the order of folding, the folding directions, and the front page as described above, thereby determining the page arrangement order.

The foregoing is the page arrangement/printing method called "work and tumble".

Referring to another method, the page arrangement order for the fourth set of machine plates is determined by a four-page pattern (2×2 page arrangement pattern) in which the number of pages in each column is two while the number of pages in each row is two), and a pair of such four-page patterns are arranged in side by side relation to each other on both of front and back (machine) plates. Paper, printed with this method, is cut, formed into a signature, and is stitched as described above for "the work and tumble", so that a 56-page book can be formed without wasting printing paper. This page arrangement for the fourth set of machine plates is called "repeat". "The page order" of the layout data in this repeat is different from that of the ordinary page arrangement, as is the case with "the work and tumble", and therefore "the page order" is determined either by forming signatures by manually folding paper, or by designating the order of folding, the folding directions, and the front page with respect to the four-page pattern and then by arranging the two four-page patterns in side by side relation on the machine plate. In this manner, the page arrangement order for the repeat (in which 8 pages are arranged on each of the front and back machine plates) can be determined.

The above procedure will be summarized below with respect to FIG. 10.

The page arrangement order for the ordinary page arrangement pattern is determined as follows:

(1) The positions and directions of the 1st, 2nd and 3rd folding operations are designated as at step A in FIG. 10.

(2) The position of the front page is designated in step B in FIG. 10.

Therefore, the page arrangement orders for the 1st to 3rd sets of machine plates are determined at step C in FIG. 10.

Then, the following is effected for the 2×2 page arrangement pattern:

(3) The positions and directions of the two folding operations are designated in step D in FIG. 10.

(4) At this time, the position of the front page is designated in step E in FIG. 10.

Therefore, the page arrangement order for the 2×2 page arrangement pattern is determined in step F in FIG. 10.

(5) One of "the work and tumble" and "the repeat" is selected, and then the 4×2 page arrangement order is determined based on the 2×2 page arrangement order in step G in FIG. 10.

In this example, although "the work and tumble" and "the repeat" is effected with respect to the fourth set of machine plates, they can be effected for any other set.

If the folding machine can handle printing paper half the size of printing paper used in the above example, the work-and-tumble pattern or the repeat pattern can be applied to all sets of machine plates, and then each printed paper is cut, the signatures are formed, and the stitching is effected.

As described above, the page arrangement order on the machine plate has heretofore been determined by one of the following two methods:

(1) Paper is actually folded manually in the predetermined manner to form the signature, and page numbers are written respectively onto a plurality of areas of the paper separated from one anther by the folding lines, thus determining the page arrangement order.

(2) The positions and directions of folding of the printed paper, the order of folding, and the front page are designated sequentially, thereby automatically determining the page arrangement order.

The manual operation in the method (1) is rather troublesome, and in the method (2), the folding direction must be correctly designated for each folding operation, and this is troublesome, particularly as the number of the folding operation increases, so that there is a possibility that a mistake is made when effecting the designation. And besides, in this case, the paper must be folded in the order shown in FIG. 6, and the front page can not be designated before the designation of the folding order is finished. This is another inconvenience.

Furthermore, when the cutting (or division) step intervenes between the printing step and the bookbinding step as in "the work and tumble" method and "the repeat" method which are often used in the printing of a page-style publication, the page arrangement order is different from the ordinary page arrangement order. In such a case, the above operation (1) or the above operation (2) must be done.

SUMMARY OF THE INVENTION

It is an object of this invention to provide a method by which a page arrangement order can be determined by designating the folding order of the printing paper and the position of a front page at first, without the need for manually forming signatures or the need for designating the order of folding, the position of a front page, and folding directions (which are liable to be designated incorrectly).

Another object of the invention is to provide a method in which when a cutting step must be carried out as in "a work-and-tumble operation" and "a repeat operation", a page arrangement order on each machine plate can be determined merely by designating an ordinary page arrangement order and the position of cutting, thereby facilitating the work-and-tumble operation and the repeat operation, and also enabling a trial and error to be done easily.

BRIEF DESCRIPTION OF THE DRAWINGS

FIG. 4B shows a condition in the case of effecting one cutting operation, with reference characters D, F1 and F3 denoting a cutting portion, a 1st folding portion and a 2nd folding portion, respectively, FIG. 14C showing "the position order" in the case of effecting the cutting operation, FIG. 14D showing "the paper order" in the case of effecting a "work and tumble operation", and FIGS. 14E and 14F showing "the page orders" for front and back plates, respectively;

DESCRIPTION OF THE PREFERRED EMBODIMENTS

A preferred embodiment of the present invention will now be described with reference to FIG. 11 which shows layout data for a machine plate.

In the layout data (FIG. 11) used when paper printed with this method is folded half by half:

(1) The order of folding (as indicated by F1, F2 and F3 in FIG. 11) are designated.

(2) An area denoted by character B is designated as "position order No. 1" (i.e., foremost position order No.).

Either of the above operations (1) and (2) may be effected first.

Since the position of the area B (hereinafter referred to as "position B") is to be the front or uppermost position, the printing paper is folded in such a manner that a right half underlies a left half. To meet this requirement (that the position B should be the front position) with respect to the subsequent folding operations F2, F3 and F4, the folding directions are determined.

Figure 12A:
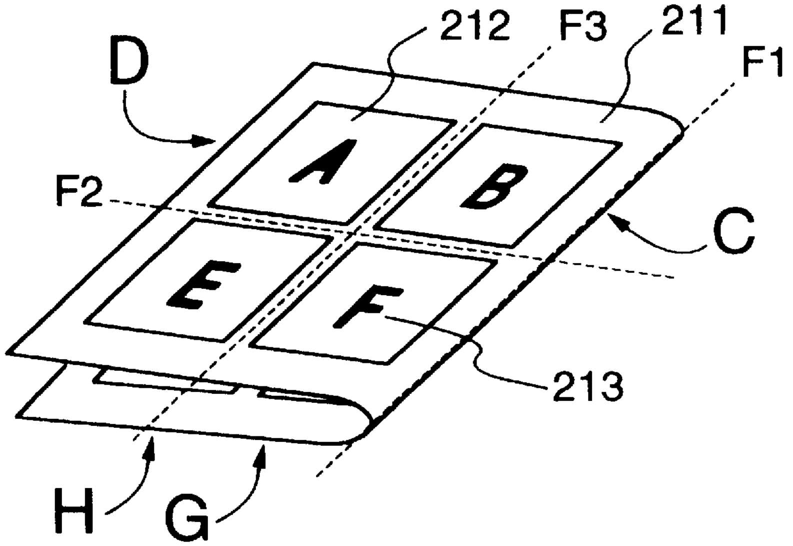
FIGS. 12A and 12B are views showing a process of folding of printing paper 211 printed in accordance with a predetermined page arrangement method, FIG. 12A showing the printing paper folded once, FIG. 12B showing the printing paper folded twice, reference numeral 212 denoting an area of the page, reference numeral 231 denoting a character distinguishing the page areas from one another, and reference characters F1, F2 and F3 (214) denoting 1st, 2nd and 3rd folding portions, respectively.
Figure 12B:
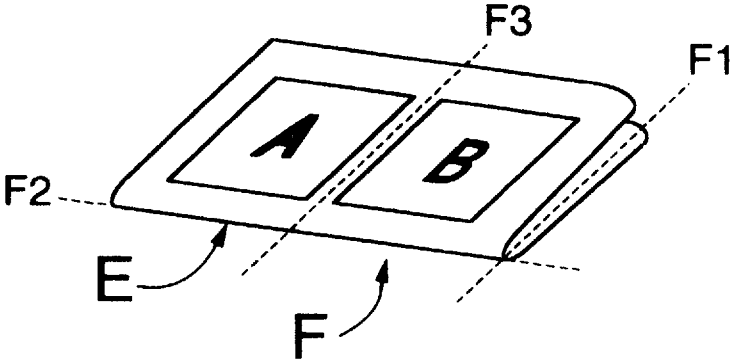

"Position order No. 2" is assigned to a position C brought into underlying relation to the position A by the first folding operation F1 (FIG. 12A). "Position order No. 3" is assigned to a position G brought into underlying relation to the position C by the second folding operation F2 (FIG. 12B). "Position order No. 4" is assigned to a position F brought into underlying relation to the position G by the first folding operation F1 (FIG. 12A). Thus, "the position order" is B (front position)→C→G→F.

Figure 11:
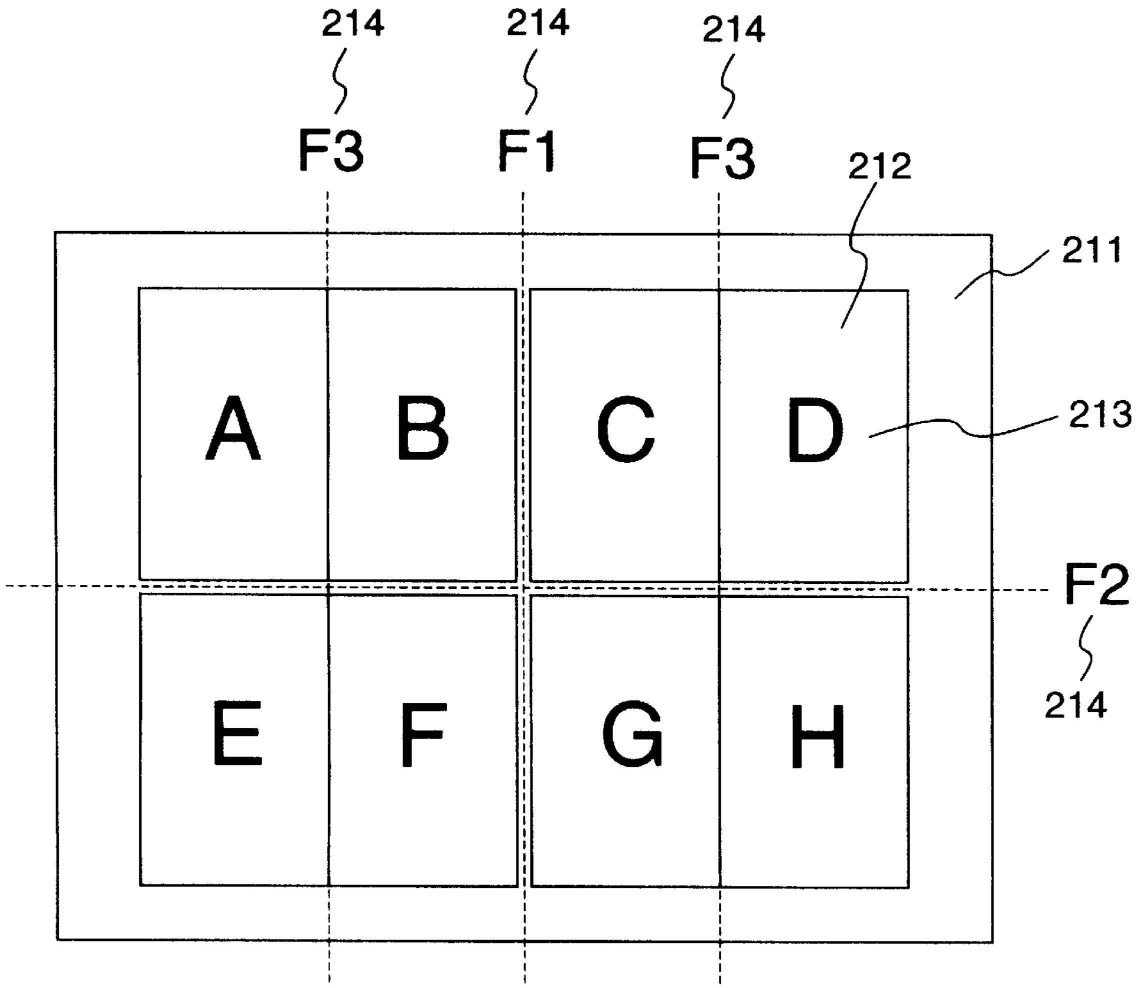
FIG. 11 is a view showing a procedure of determining page numbers according to the present invention, reference numeral 211 denoting a printing paper printed in accordance with a predetermined page arrangement method, reference numeral 212 denoting an area of the page, reference numeral 213 denoting a character distinguishing the page areas from one another, and reference characters F1, F2 and F3 (214) denoting 1st, 2nd and 3rd folding portions, respectively.

As a result of the folding operations F1 and F2, the positions B, C, F and G are arranged one upon another in the same manner as the positions A, D, E and H (FIG. 11). Namely, the positions B, C, F and G are arranged one upon another in the order of B→C→G→F, and therefore the positions A, D, E and H are arranged one upon another in the order of A→D→H→E or in the reverse order of E→H→D→A. Here, "position order No. 5" is assigned to the position E brought into underlying relation to the position F by the third folding operation F3, and therefore "the position order" is the latter, and hence "position order Nos. 6, 7 and 8" are assigned to the positions H, D and A, respectively.

As described above, when B is designated as the front position in the folding operations F1, F2 and F3, "the position order" is as follows:

B→C→G→F→E→H→D→A

Any two positions to be arranged one upon the other by the folding operation are symmetrical with respect to the folding line along which they are to be folded. Therefore, the above "position order" can be represented in the following manner:

B→the position symmetrical thereto with respect to F1
→the position symmetrical thereto with respect to F2
→the position symmetrical thereto with respect to F1
→the position symmetrical thereto with respect to F3
→the position symmetrical thereto with respect to F1
→the position symmetrical thereto with respect to F2
→the position symmetrical thereto with respect to F1

In summary, after the front position is designated, the order of arrangement of the areas of the paper one upon another can be determined, following the symmetrical positions in the following sequence:

F1→F2→F1→F3→F1→F2→F1

Figure 1:
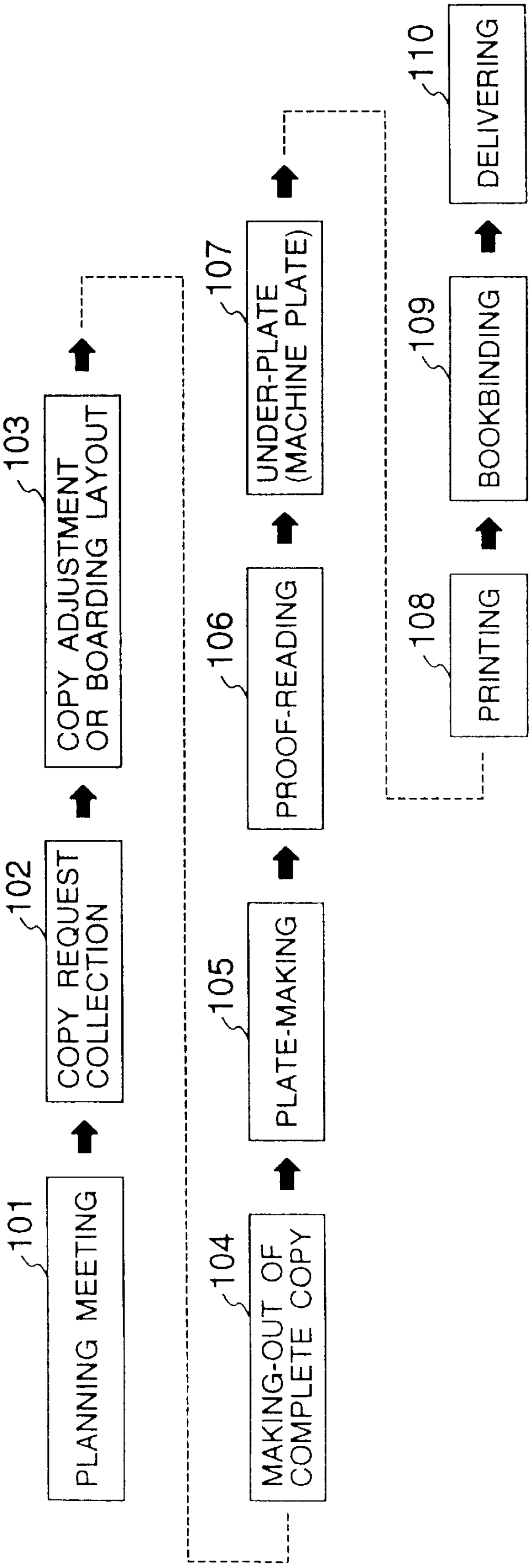
FIG. 1 is a flow chart showing a general procedure for making a printed publication.
Figure 2A:
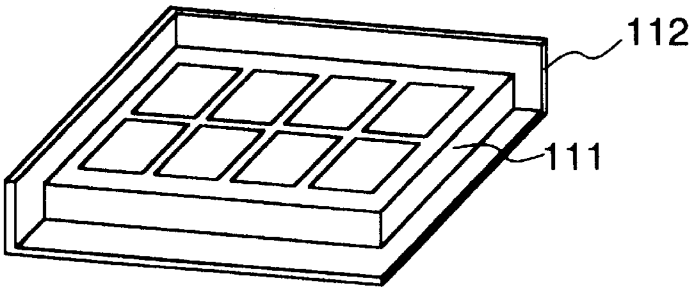
FIG. 2A to 2E are illustrations schematically showing a bookbinding process, FIG. 2A showing an edge true-up operation in which edges of printed papers 111, each having a plurality of pages printed on its front and back surfaces in a predetermined order, are trued up by a true-up machine 112, FIG. 2B showing a cutting operation effected by a cutter 113, FIG. 2C showing a folding operation in which the printed paper is folded by a folding machine once as at 114, twice as at 115 and three times as at 116, FIG. 2D showing a gathering operation in which a plurality of kinds of the folded papers (signatures or sections) 117 to 120 are stacked one upon another as at 121 to 124 in a predetermined page order, and FIG. 2E showing a cutting operation in which three sides of the combined signatures 125 (in which the pages are arranged in the predetermined order) with a cover except for its back are cut by a cutter 126.
Figure 2B:
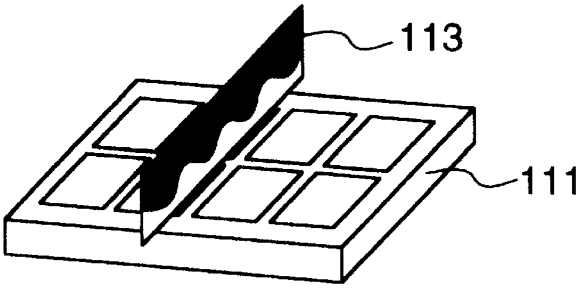
Figure 2C:
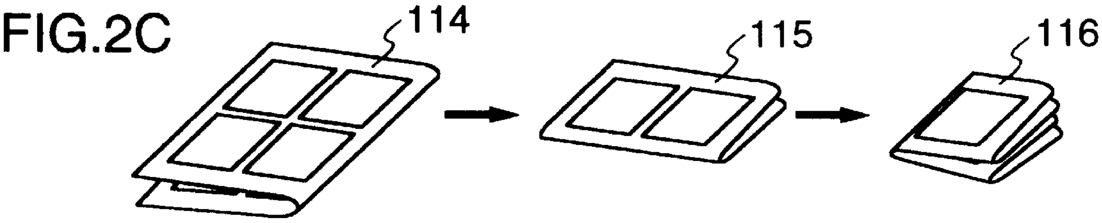
Figure 2D:
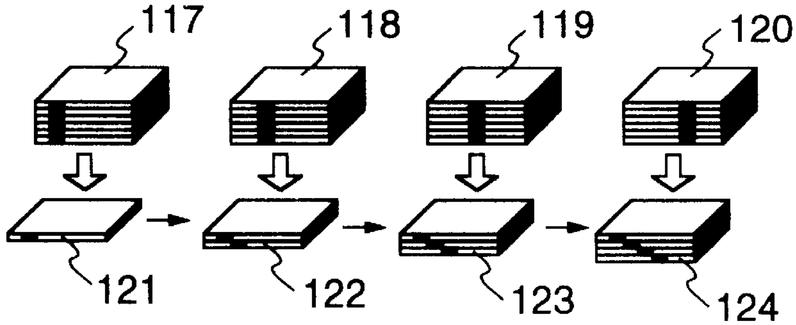
Figure 2E:
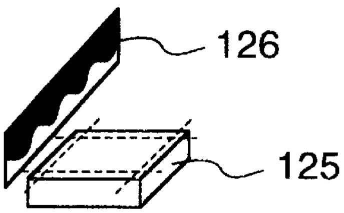
Figure 3:
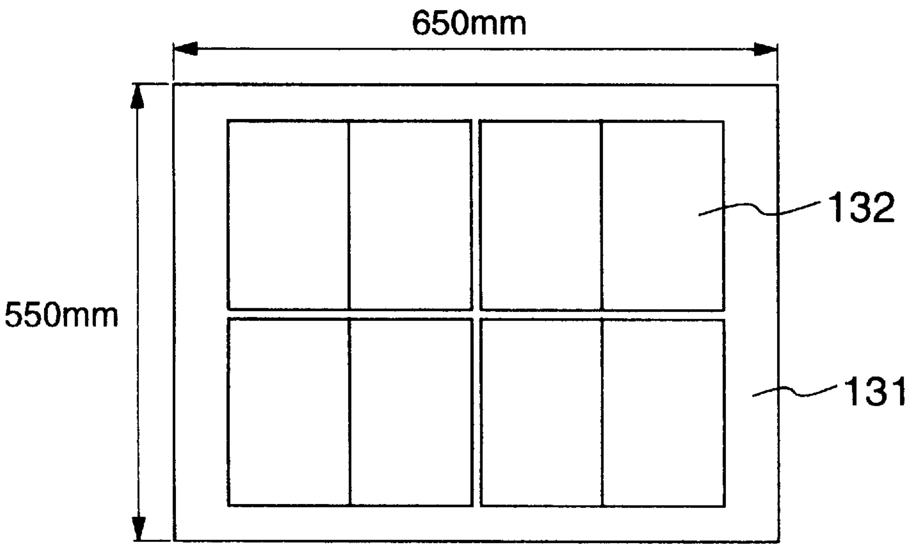
FIG. 3 is a view showing A5-size (148 mm×210 mm) pages 132 arranged in two rows and four columns on a machine plate 131 having a size of 650 mm×550 mm.
Figure 4A:
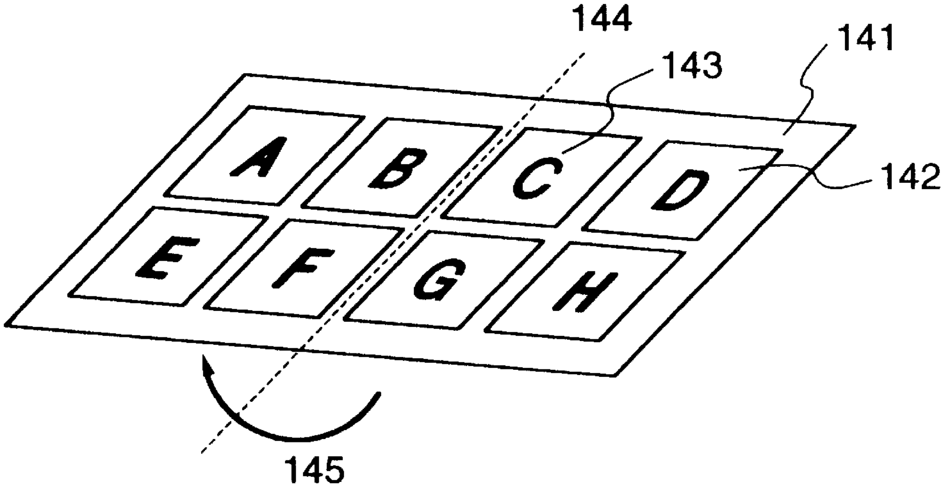
FIGS. 4A to 4D are views showing a process in which the printed paper 141 is folded such that the pages are arranged one upon another, reference numeral 142 denoting the area of the page, reference numeral 143 denoting a character distinguishing the pages from one another, reference numerals 144 and 145 denoting the position and direction of a 1st folding operation, respectively, reference numerals 146 and 147 denoting the position and direction of a 2nd folding operation, respectively, and reference numerals 148 and 149 denoting the position and direction of a 3rd folding operation, respectively.
Figure 4B:
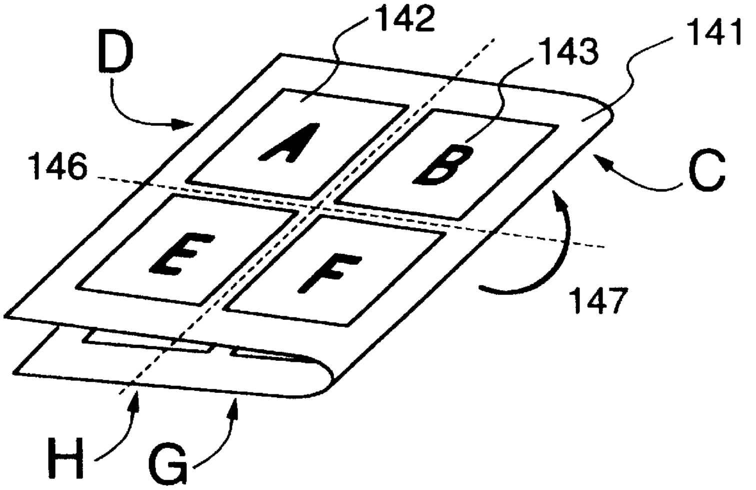
Figure 4C:
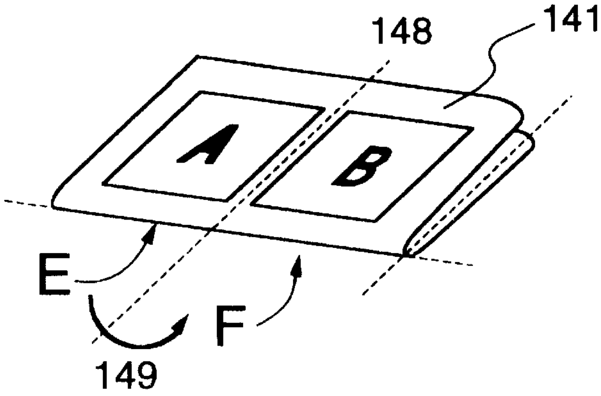
Figure 4D:
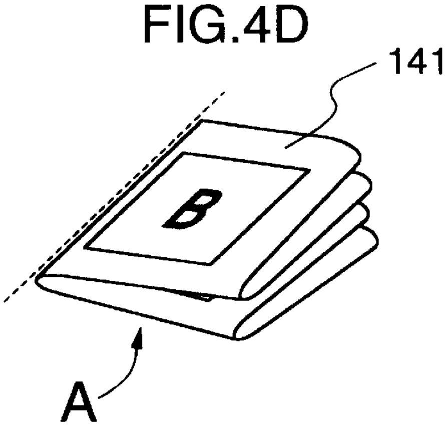
Figure 5A:
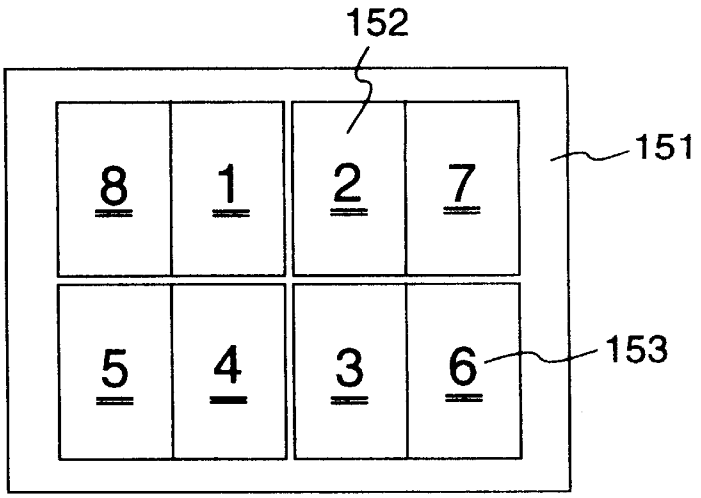
FIGS. 5A to 5C are illustrations showing the order of arrangement of pages on a machine plate 151, reference numeral 152 denoting the position at which the page is printed, reference numeral 154 denoting numbers representing the order of printing of the pages onto the respective positions, and reference numeral 154 denoting "the page order"

"The position order" thus determined is as shown in FIG. 5A in which a numeral with a double underline indicates "the position order No.".

In this example, the position B is designated as the front position, the above order-determining method does not rely only on the front position.

Figure 13:
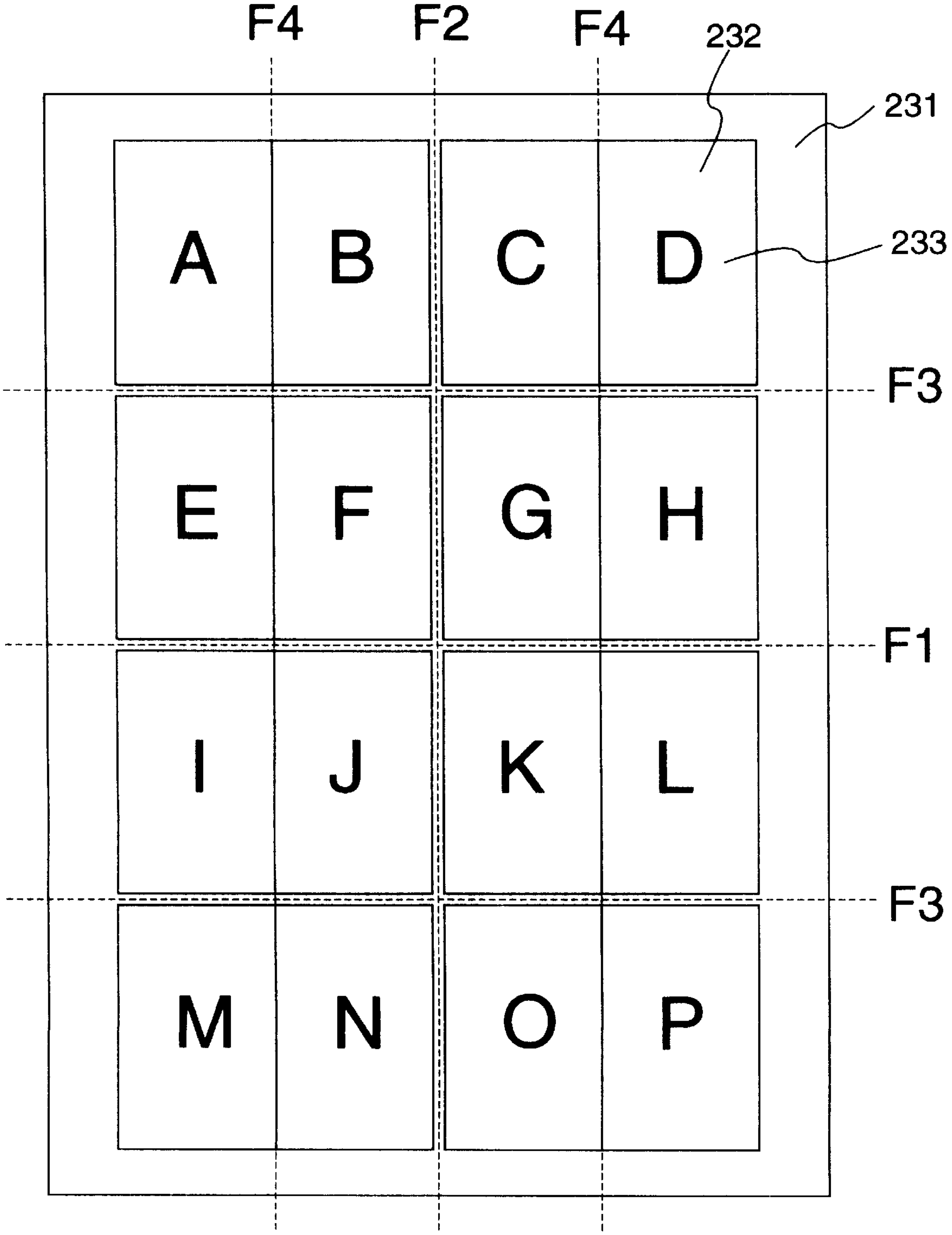
FIG. 13 is a view showing printing paper 231 which is printed in such a manner that pages are arranged in four rows and four columns on a machine plate, reference numerals 232 denoting an area of the page, reference numeral 233 denoting a character distinguishing the page areas from one another, and reference characters F1, F2, F3 and F4 denotes 1st, 2nd, 3rd and 4th folding portions, respectively.

Next, let's consider the case where paper is folded four times (FIG. 13).

In this case, an area B is also designated as a front position ("position order No. 1"). "Position Nos. 1 to 8" can be determined in the same manner as described above, and as a result the following "position order" is obtained:

B→the position symmetrical thereto with respect to F1
→the position symmetrical thereto with respect to F2
→the position symmetrical thereto with respect to F1
→the position symmetrical thereto with respect to F3
→the position symmetrical thereto with respect to F1
→the position symmetrical thereto with respect to F2
→the position symmetrical thereto with respect to F1

Namely, the position order is as follows:

B→N→O→C→G→K→J→F

As a result of the folding operations F1, F2 and F3, the areas A, D, E, H, I, L, M and P are arranged one upon another in the same order as the areas B, C, F, G, J, K, N and O. Therefore, "the position order" thereof is either A→M→P→D→H→L→I→E or a reverse order, that is, E→I→L→H→D→P→M→A. Here, "position order No. 9" is assigned to the area E brought into underlying relation to the area F (whose position order No. is 8) by the fourth folding operation F4, and therefore the areas are arranged one upon another in the latter order.

Therefore, "the position order" can be determined, following the symmetrical positions (with respect to the folding lines) from the front position in the following sequence.

F1→F2→F1→F3→F1→F2→F1→F4→F1→F2→F1→F3→F1→F2→F1

This will hereinafter be referred to as "symmetrical operation order row".

If the number of folding operations increases, "the position order" can be determined in a similar manner.

Let's assume that an nth folding operation is represented by Fn, and that a symmetrical operation order row obtained in this case is represented by P(n). The order reverse to P(n) will be represented by $P(n)^{-1}$. Namely, if the following is established:

P(n)=a→b→c

Then, the following is established:

$P(n)^{-1}$=c→b→a

A procedure for determining "the position order" using this notation is as follows:

(A) P(1)=F1 (formula 1)

(B) P(n)=P(n−1)→Fn→$P(n-1)^{-1}$ (formula 2)

Using these formulas, the symmetrical operation order row P(n) (in which the number of folding operations is n) can be determined.

"The position order" for arranging the pages can be determined, following the symmetrical positions from the front page in the sequence determined by P(n).

With respect to "the position order" thus determined, the order of arrangement of pages can be determined, taking front and back surfaces of printing paper into consideration. More specifically, pages 1, 4, 5, 8 . . . (which will appear on a front surface of printing paper in accordance with its "position order"), represented by $2*n-(1-(-1)^n)/2$ (n=1, 2, 3 . . . ), are allocated to a front machine plate for printing the front surface of printing paper, whereas pages 2, 3, 6, 7 . . . (which will appear on a back (or opposite) surface of the printing paper), represented by $2*n-(1+(-1)^n)/2$ (n=1, 2, 3 . . . ), are allocated to a back machine plate for printing the back surface of the printing paper. Assuming that the surface of the printing paper having page 1 is the front surface, page 2 appears on the back surface. The next page appears on the back surface. The next page appears on the opposite surface, that is, the front surface. Namely, the order of the page surfaces is represented by repeating a pattern of "front"→"back"→"back"→"front". When this is applied in the order beginning with page 1, the arrangement of pages 1, 4, 5, 8 . . . and the arrangement of pages 2, 3, 6, 7 . . . are obtained, as described above. The pages appearing on the front surface are represented by $2*n-(1-(-1)^n)/2$ (n=1, 2, 3 . . . ), and the pages appearing on the back surface are represented by $2*n-(1+(-1)^n)/2$ (n=1, 2, 3 . . . ).

Figure 5B:
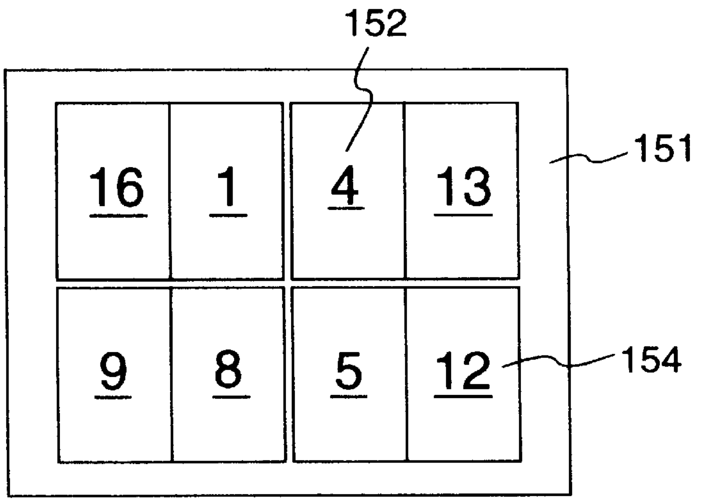
Figure 5C:
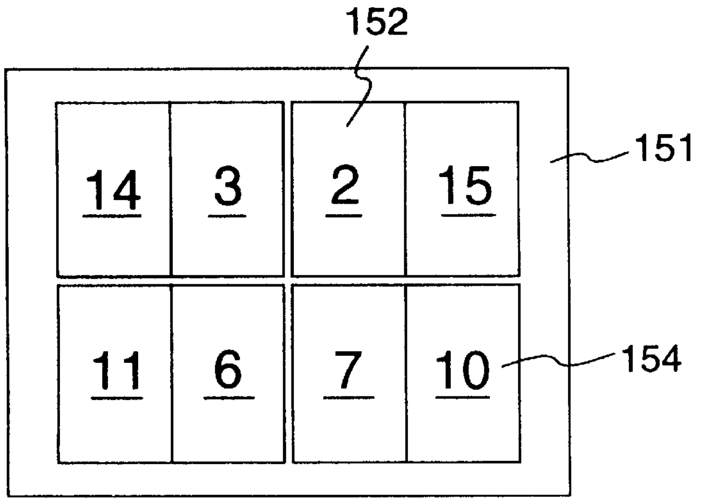

When "the page order" is determined based on "the position order" of FIG. 5A in accordance with the above procedure, "the page order" for the front surface is as shown in FIG. 5B while "the page order" for the back surface is as shown in FIG. 5C. A numeral with an underline in FIGS. 5B and 5C denotes "page order No.", and a numeral with a double underline in FIG. 5A denotes "position order No.". In this example, printing is applied to discrete or separate paper sheets and after one surface of the printing paper is printed, the printing paper is turned over in a right-left direction, and the back surface is printed.

"The thus determined page orders" of FIGS. 5B and 5C are sequentially allocated to pages of a publication to be printed, thereby determining the page arrangement on the machine plates as shown in FIGS. 7A to 7H.

A feature of "the work and tumble method" and "the repeat method" is that the printed paper is cut to be divided into segments at least once before the bookbinding. Different page arrangements are applied respectively to the areas of the machine plate corresponding respectively to the segments of the printing paper separated from each other by cutting. Namely, the page arrangement order is determined for each area.

Figure 14A:
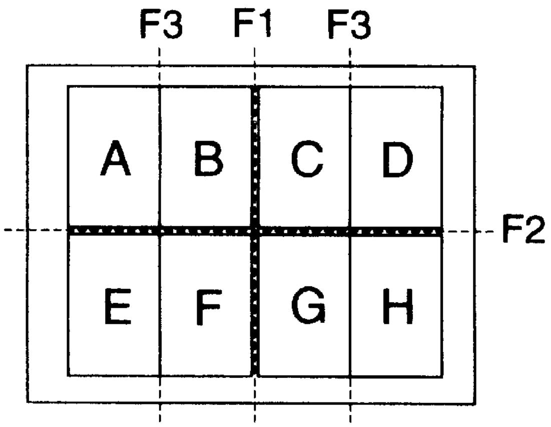
FIGS. 14A t 14F are views showing a procedure for determining a page arrangement order in the case of effecting a cutting operation, FIG. 14A showing the folding order in the case of not effecting the cutting operation, with reference characters F1, F2 and F4 denoting 1st, 2nd and 3rd folding portions, respectively.
Figure 14B:
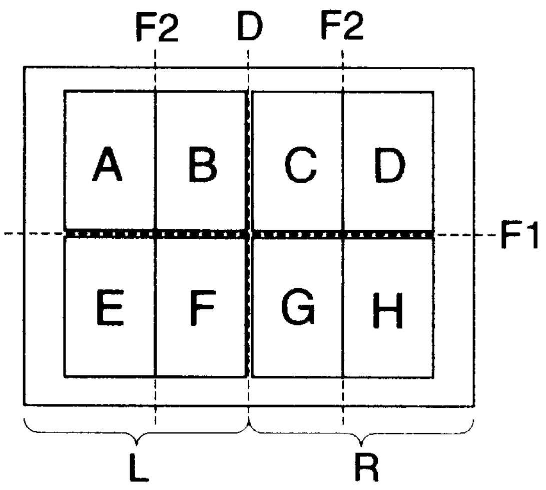
Figure 14C:
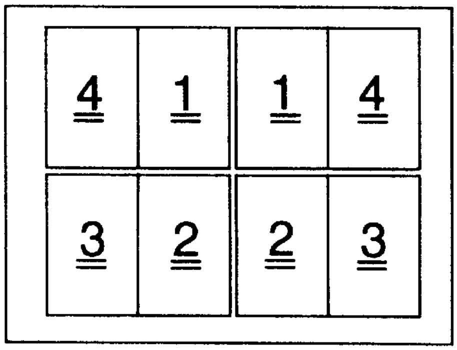

A specific example will now be described with reference to FIG. 14. With respect to a machine plate (FIG. 14A) which would be divided into 8 areas in accordance with three folding operations in the ordinary page arrangement method, a cutting (or division) line corresponds to the first folding line in the ordinary page arrangement method, and the subsequent folding lines, that is, first and second folding lines, correspond respectively to the second and third folding lines in the ordinary page arrangement method (FIG. 14B). Namely, those lines along which the first, second and third folding operations are effected, respectively, in the ordinary page arrangement method, are designated as the cutting line, the first folding line and the second folding line, respectively. Then, "the position order" for a left half L of the machine plate is determined in accordance with the order of folding, with the position B designated as the front position (FIG. 14C).

Incidentally, the second folding line in the ordinary page arrangement method may be designated as a cutting line, in which case the 1st, 3rd, 4th . . . folding operations in the ordinary page arrangement method are designated as the 1st, 2nd and 3rd folding lines after the cutting operation. The areas of the other half R of the machine plate, separated from the left half by the cutting (or division) line D, are arranged in an order symmetrical to the areas of the left half with respect to the cutting line D, and pages (1, 4, 5, 8 . . . ) to appear on the front surface are allocated to one of the halves L and R whereas pages (2, 3, 6, 7 . . . ) to appear on the back surface are allocated to the other half. By doing so, "the page order" for "the work and tumble method" can be determined (FIG. 14D) in which case the back plate does not need to be not taken into consideration.

Referring next to the repeat method, the page arrangement order of the right half R accurately corresponds to the page arrangement order of the left half L, and pages to appear on the front surface of printing paper are allocated to a front machine plate whereas pages to appear on the back surface are allocated to a back machine plate in such a manner that the front and back surfaces of the printing paper correspond in positional relation to each other. With this method, "the page order" of "the so-called repeat method" is obtained (FIGS. 14E and 14F).

According to the above procedure, the page order of the whole of the machine plate can be determined only by designating the order of folding and the front position (that is, front page). In this case, either the folding order or the page position can be designated first.

In the page arrangement pattern incorporating the cutting (division) step, the cutting is effected along that portion corresponding to the first folding line in the ordinary page arrangement method, and the folding lines (and hence the folding order) is sequentially shifted by one, and merely by designating either of "the work and tumble" and "the repeat", the page order of the work and tumble or the repeat can be automatically designated. Thus, without specially preparing machine plate layout data for the page arrangement order for the repeat as in the conventional method, the work and tumble processing and the repeat processing can be carried out easily.

DESCRIPTION OF THE PREFERRED EMBODIMENT

A preferred embodiment of an apparatus (or system) of the invention for determining "the page order" will now be described with reference to the drawings.

Figure 15:
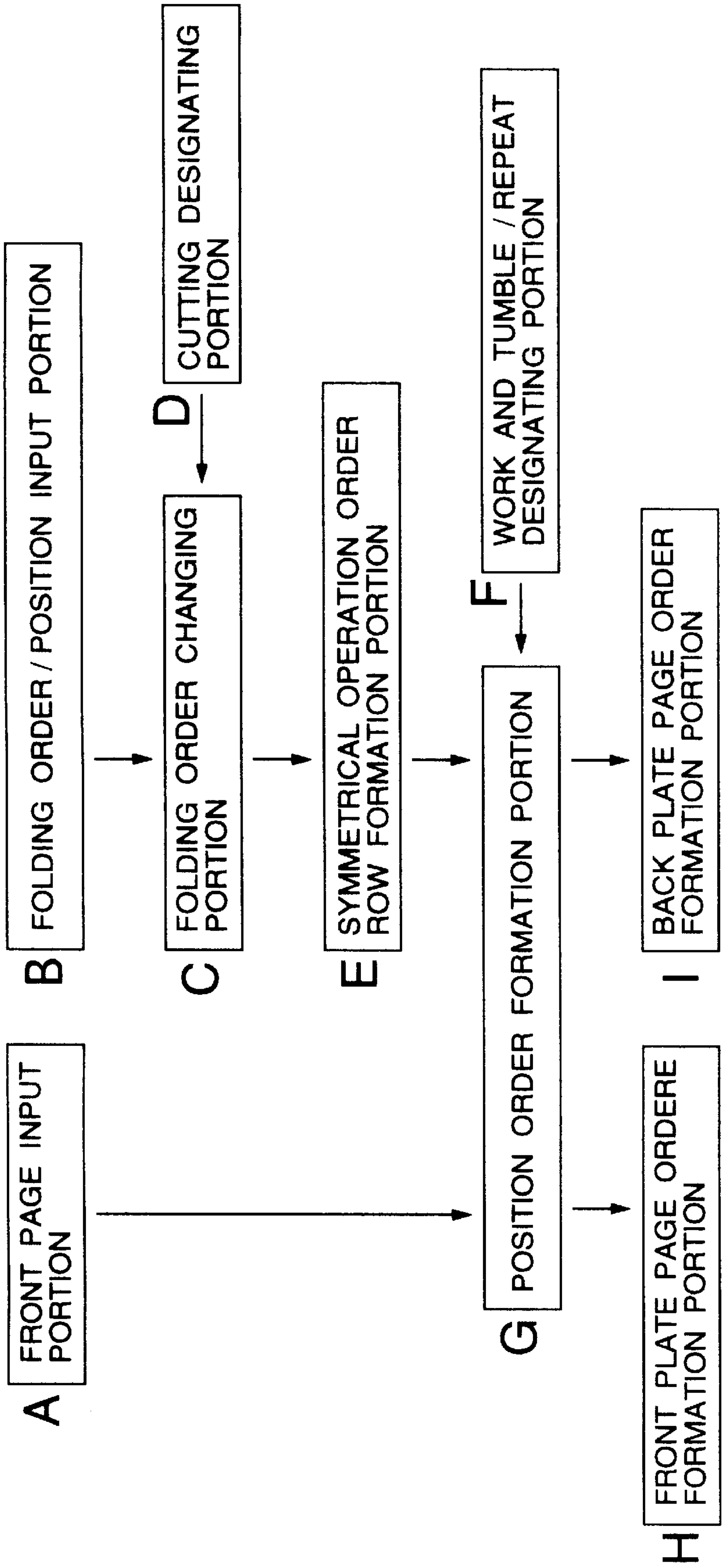
FIG. 15 is a block diagram showing a procedure for determining the order of arrangement of pages according to the present invention.

FIG. 15 is a block diagram showing the functions of the apparatus. The apparatus comprises a front page input portion a, and a folding order/position input portion b. After these data are input, a symmetrical operation order row formation portion e forms a symmetrical operation order row in accordance with the folding position/order data, inputted by the input portion b, based on the formulas (1) and (2). After the symmetrical operation order row is thus formed, a "position order" formation portion g forms a position order to be used. In this case, the cutting operation is not carried out, and therefore a folding order changing portion c, a cutting designating portion d, and a turn-and-tumble/repeat designating portion f do not perform any processing.

Figure 16:
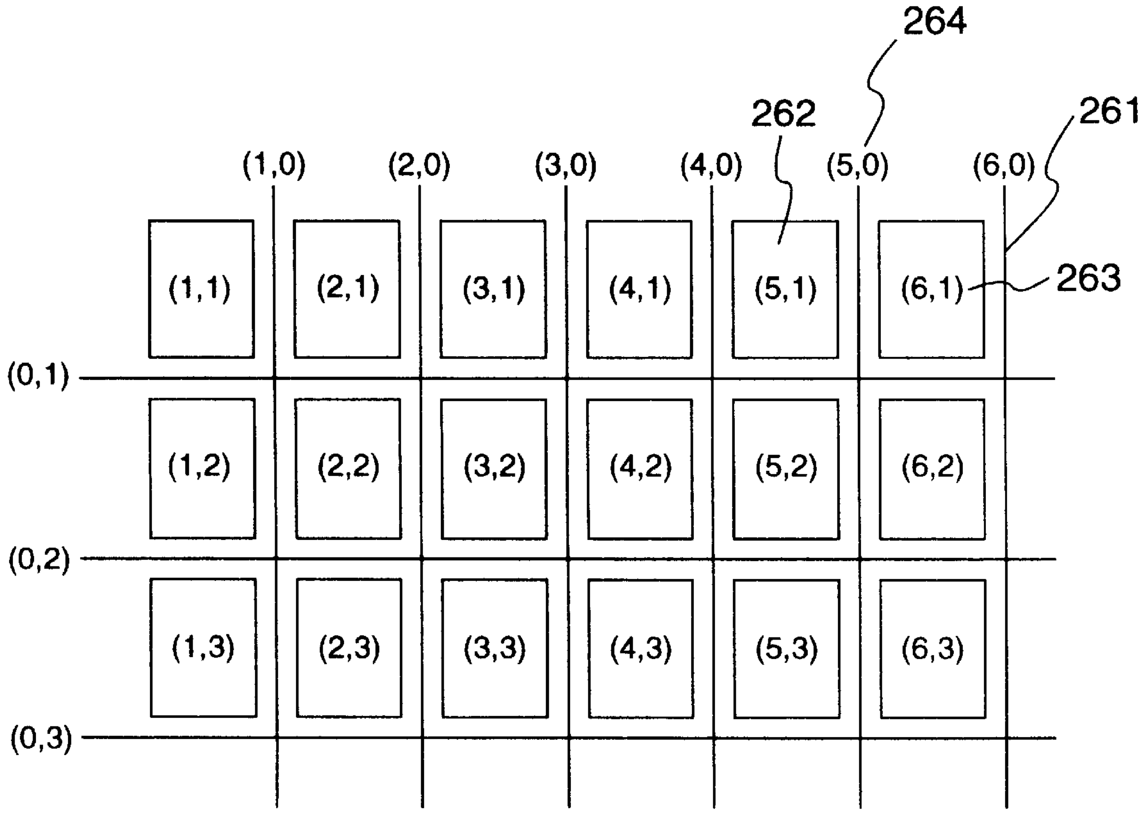
FIG. 16 is a view showing a procedure for determining "the position order" of the invention, reference numeral 261 denoting a folding line, reference numeral 262 denote the page position, reference numerals 263 denoting numerals representing the page position, and reference numeral 264 denoting the position of a folding line.

The formation of "the position order" will now be described with reference to FIG. 16. Here, the position of the page on the machine plate is represented by (m, n) as shown in FIG. 16. m represents the page position number counting from left, and n represents the page position number counting from top. The folding lines are represented by (k, 0), (0, 1) as shown in FIG. 16. Here, (k, 0) represents the kth vertical folding line counting from left, and (0, 1) represents the 1st horizontal folding line counting from top.

Expressing the example of FIG. 11 by this method, the front page position is represented by (2, 1), the order of folding is (2, 0)→(0, 1)→[(1, 0) and (3, 0)] (In the third folding operation, the folding is effected at two portions (1, 0) and (3, 0) at the same time). Therefore, the symmetrical operation order row is as follows:

(2, 0)→(0, 1)→(2, 0)→[(1, 0) and (3, 0)]→(2, 0)→(0, 1)→(2, 0) (formula 3)

The position symmetrical to (m, n) with respect to (k, 0) can be expressed as follows:

$$(m+(2*k-(2*m-1)), n) \quad \text{(formula 4)}$$

The position symmetrical to (m, n) with respect to (0, 1) can be expressed as follows:

$$(m, n+(2*1-(2*n-1))) \quad \text{(formula 5)}$$

When the folding is effected at two portions as in the third folding operation, the position next to the preceding position is one of two positions, symmetrical to this preceding position respectively with respect to the two relevant folding lines, which is closer to the preceding position. Namely, one of the above two positions (calculated respectively from the formula 4 or the formula 5) which is closer to the preceding position is selected.

Determination of "Position Order"

The position symmetrical to the front page position (2, 1) with respect to the first folding line (2, 0) of the symmetrical operation order row is calculated from the formula (4), so that "position order No. 2" is assigned to the position (3, 1).

Then, the position symmetrical to the position (3, 1) with respect to the 2nd folding line (0, 1) of the symmetrical operation order row is calculated from the formula (5), so that "position order No. 3" is assigned to the position (3, 2).

Then, the position symmetrical to the position (3, 2) with respect to the 3rd folding line (2, 0) of the symmetrical operation order row is calculated from the formula 4, so that "position order No. 4" is assigned to the position (2, 2). The position next to the position (2, 2) is one of two positions, symmetrical to the position (2, 2) respectively with respect to the folding line (1, 0) and the folding line (3, 0), which is closer to the position (2, 2). From the formula 4, it is decided that the position symmetrical with respect to the folding line (1, 0) is the position (1, 2), and that the position symmetrical with respect to the folding line (3, 0) is the position (5, 2). "Position order No. 5" is assigned to the position (1, 2) closer to the position (2, 2).

Then, this processing is continued in a similar manner, and "the position order" is determined as follows:

$$(2, 1)\rightarrow(3, 1)\rightarrow(3, 2)\rightarrow(2, 2)\rightarrow(1, 2)\rightarrow(4, 2)\rightarrow(4, 1)\rightarrow(1, 1)$$

Thus, the order as shown in FIG. 5A has been determined.

In connection with "this position order", numerals represented by $2*n-(1-(-1)^n)/2$ (n=1, 2, 3 . . . ) are sequentially allocated by a front plate "page order" formation portion h of FIG. 15, so that "the page order" for the front machine plate as shown in FIG. 5B is formed. Similarly, numerals represented by $2*n-(1+(-1)^n)/2$ (n=1, 2, 3 . . . ) are sequentially allocated by a back plate "page order" formation portion i of FIG. 15, so that "the page order" for the back machine plate as shown in FIG. 5C is formed.

In the case of cutting (division) operation

Assume that the data for the front page, the folding order and the position, which are required when not effecting the cutting operation, have already been input. If a cutting operation is designated by the cutting designating portion d, the folding order is changed at the folding order changing portion h such that the 1st folding line is changed to a cutting line, and that the subsequent (2nd, 3rd . . . ) folding lines are changed to 1st, 2nd . . . folding lines, respectively. This is expressed as follows:

If no cutting: (2, 0)→(0, 1)→[(1, 0) and (3, 0)]

If there is a cutting: (0, 1)→(1, 0); (0, 1)→(3, 0); (2, 0) represents the cutting line.

Thus, the two folding orders are provided. Then, the folding order is determined only by those folding lines relevant to the front page position (2, 1). With respect to the folding order, those folding lines relevant to the front page are (0, 1)→(1, 0). Therefore, the following symmetrical operation order row is formed by the symmetrical operation order formation portion c:

$$(0, 1)\rightarrow(1, 0)\rightarrow(0, 1)$$

Then, "the position order" from the front page position (2, 1) on is formed by the "the position order" formation portion g as follows:

$$(2, 1)\rightarrow(2, 2)\rightarrow(1, 2)\rightarrow(1, 1) \quad \text{(formula 6)}$$

"The position order" of those areas on the other side of the cutting line is determined to be symmetrical to "the position order" of the above areas with respect to the cutting line. Therefore, the following is provided:

$$(3, 1)\rightarrow(3, 2)\rightarrow(4, 2)\rightarrow(4, 1) \quad \text{(formula 7)}$$

Figure 14D:
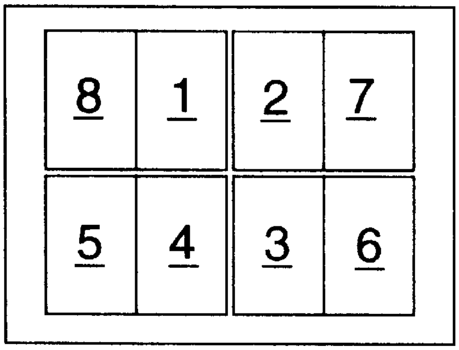
Figure 14E:
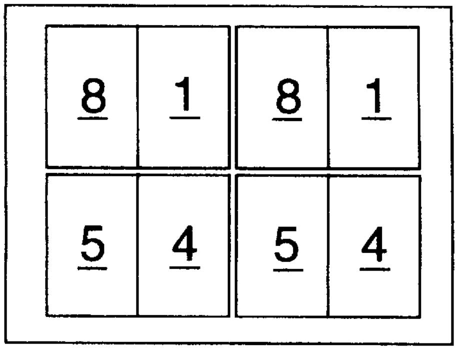
Figure 14F:
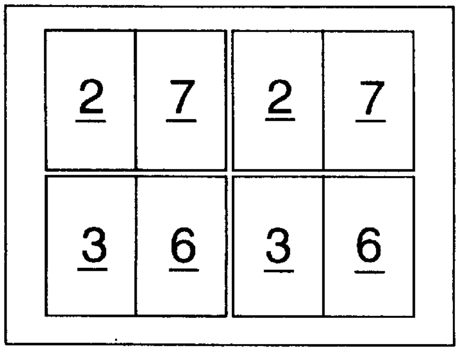

If "the work and tumble" is designated at the work-and-tumble/repeat designating portion f, numerals represented by $2*n-(1-(-1)^n)/2$ (n=1, 2, 3 . . . ) are sequentially allocated in the order of the formula 6 at the front plate "page order" formation portion h, and numerals represented by $2*n-(1+(-1)^n)/2$ (n=1, 2, 3 . . . ) are sequentially allocated, so that "the page order" for the work and tumble is formed as shown in FIG. 14D.

If "the repeat" is designated at the work-and-tumble/repeat designating portion f, numerals represented by $2*n-(1-(-1)^n)/2$ (n=1, 2, 3 . . . ) are sequentially allocated in the order of the formula 6 at the front plate "page order" formation portion h. Then, this order is applied to those areas on the opposite side of the cutting line in such a manner that the two orders are symmetrical with respect to the cutting line, thereby determining the front plate "page order" (FIG. 14E).

Similarly, numerals represented by $2*n-(1+(-1)^n)/2$ (n=1, 2, 3 . . . ) are sequentially allocated in the order of the formula 7 at the back plate "page order" formation portion i. Then, this order is applied to those areas on the opposite side of the cutting line in such a manner that the two orders are symmetrical with respect to the cutting line, thereby determining the back plate "page order" (FIG. 14F).

Figure 6:
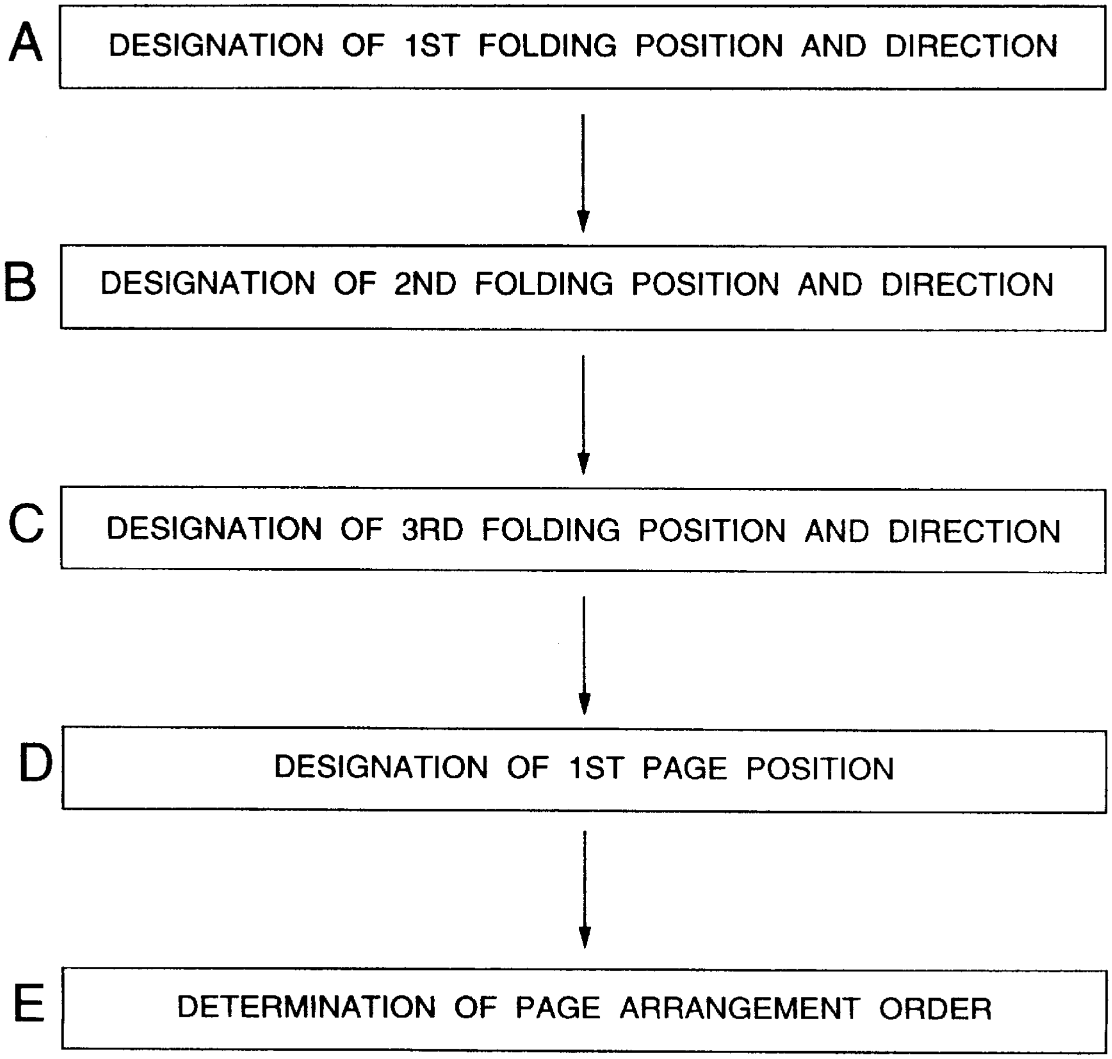
FIG.6 (PRIOR ART)
FIG. 6 is a block diagram briefly showing a conventional procedure for automatically determining "the page order"
Figure 7A:
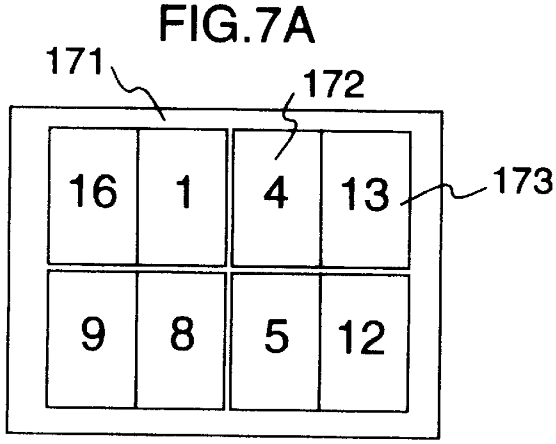
FIGS. 7A to 7H are views showing a condition in which 56 pages 172 (whose numbers are denoted at 173) arranged on machine plates 171, reference characters a and b denoting a 1st set of front and back plates, respectively, reference characters c and d denoting a 2nd set of front and back plates, respectively, reference characters e and f denoting a 3rd set of front and back plates, respectively, and reference characters g and h denoting a 4th set of front and back plates, respectively.
Figure 7B:
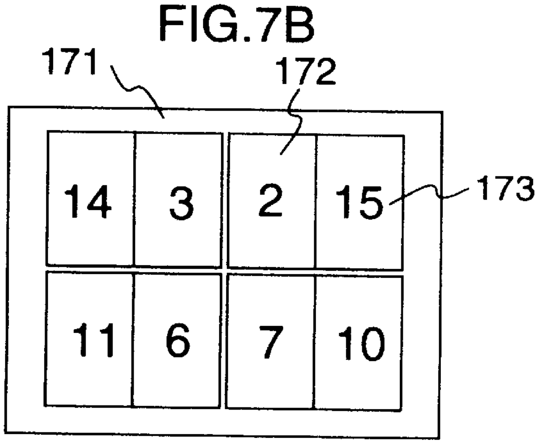
Figure 7C:
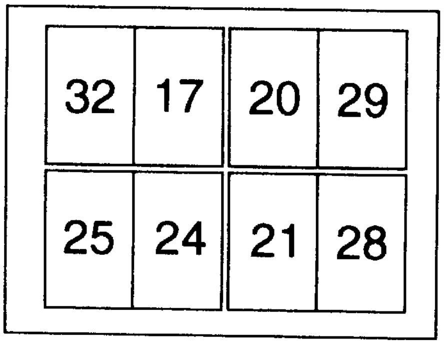
Figure 7D:
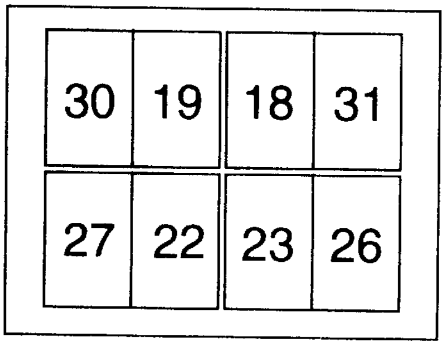
Figure 7E:
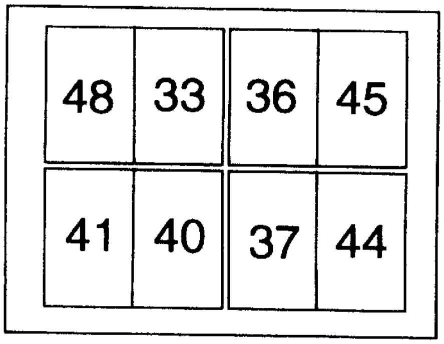
Figure 7F:
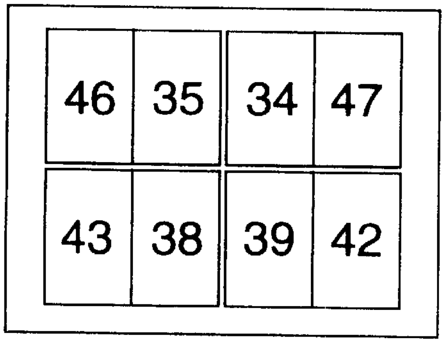
Figure 7G:
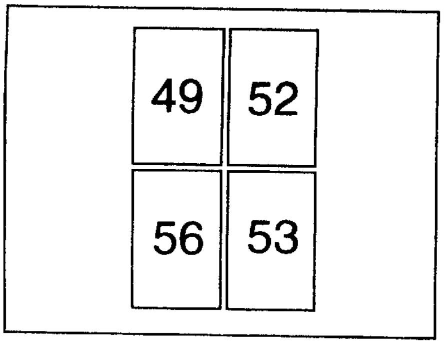
Figure 7H:
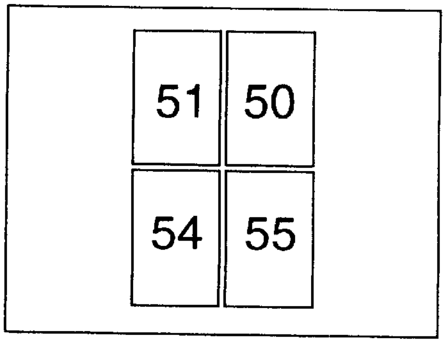
Figure 8:
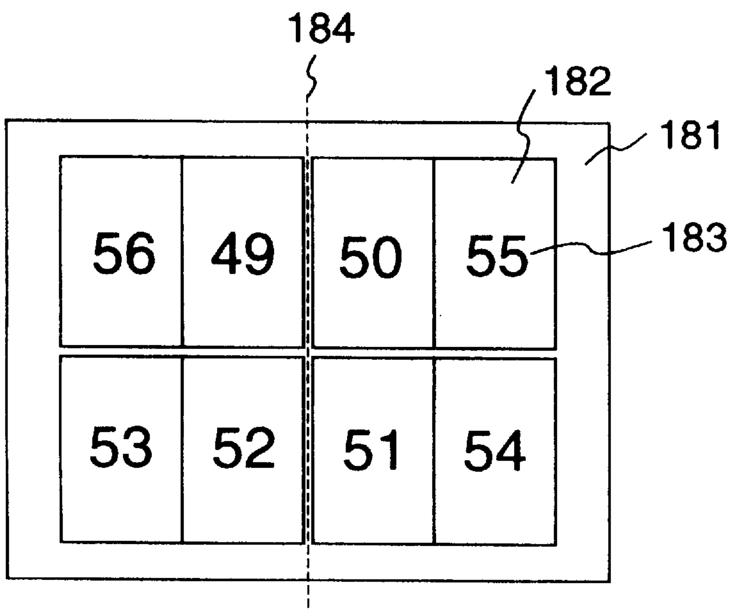
FIG. 8 is a view showing positions of pages 182 on a machine plates 181 (corresponding to the 4th set of plates of FIG. 7) in the case of effecting the printing using a "work and tumble" operation, reference numeral 183 denoting the page number, and reference numeral 184 denoting a cutting line.
Figure 9B:
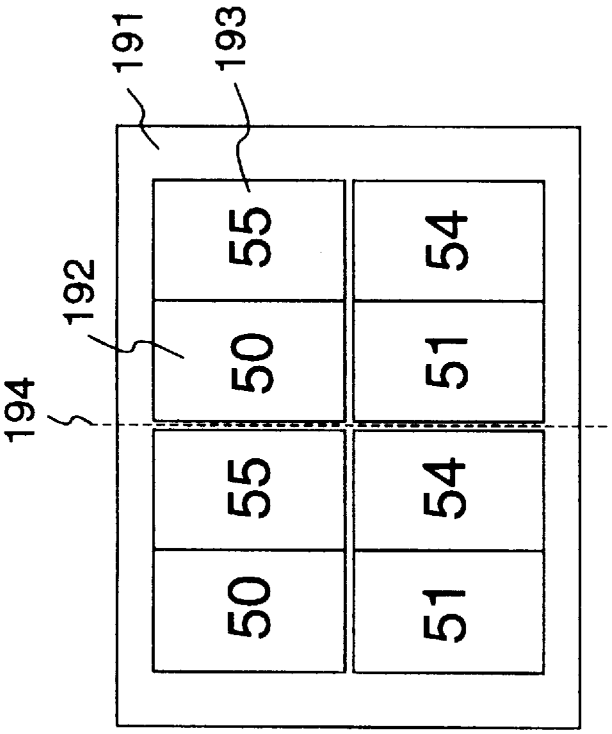
FIGS. 9A–9B are views showing positions of pages 192 on machine plates 191 (corresponding to the 4th set of plates of FIG. 7) in the case of effecting the printing using a "repeat" operation, reference numeral 193 denoting the page number, and reference numeral 194 denoting a cutting line.
Figure 9A:
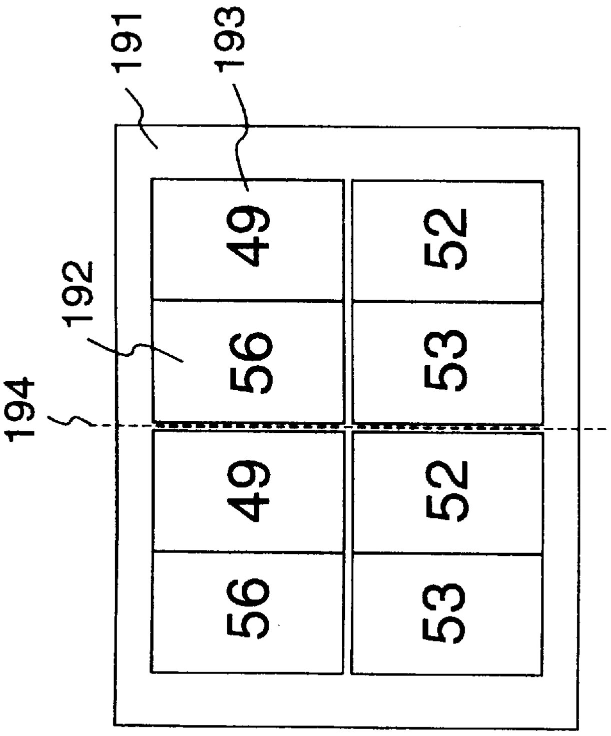
Figure 17:
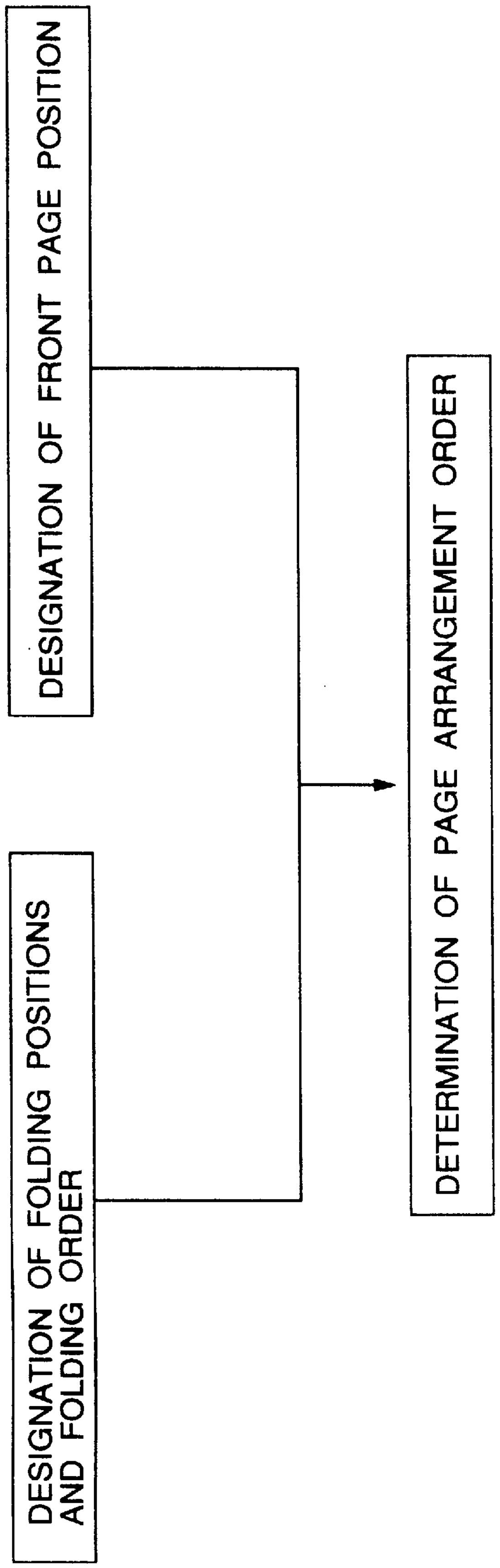
FIG. 17 is a block diagram briefly showing a procedure for automatically determining "the page order" according to the invention.
Figure 18:
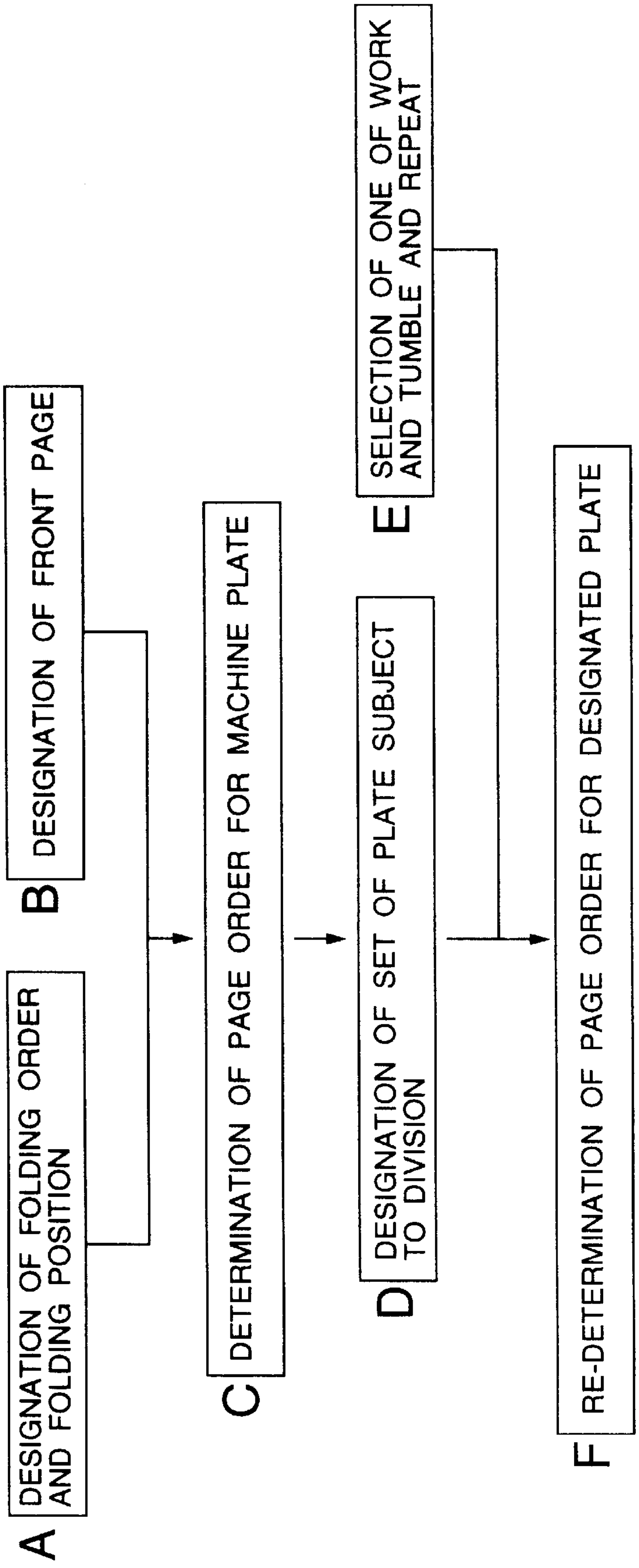
FIG. 18 is a block diagram showing a procedure for determining the order of arrangement of pages in the case of effecting the cutting operation according to the invention.

As described above, in the present invention, when a plurality of pages are to be arranged on a machine plate, a film for forming a machine plate, or a base paper, the determination of the order of arrangement of the pages does not need to rely on the procedure of FIG. 6, in which paper is actually folded manually, page Nos. are put on the folded paper, and the folding order and directions, as well as the front page position, are designated in the order of the operations. Instead, the page arrangement order is determined by the procedure of FIG. 17 in which the order of folding of printing paper, the folding order and the front page position are designated.

Figure 10:
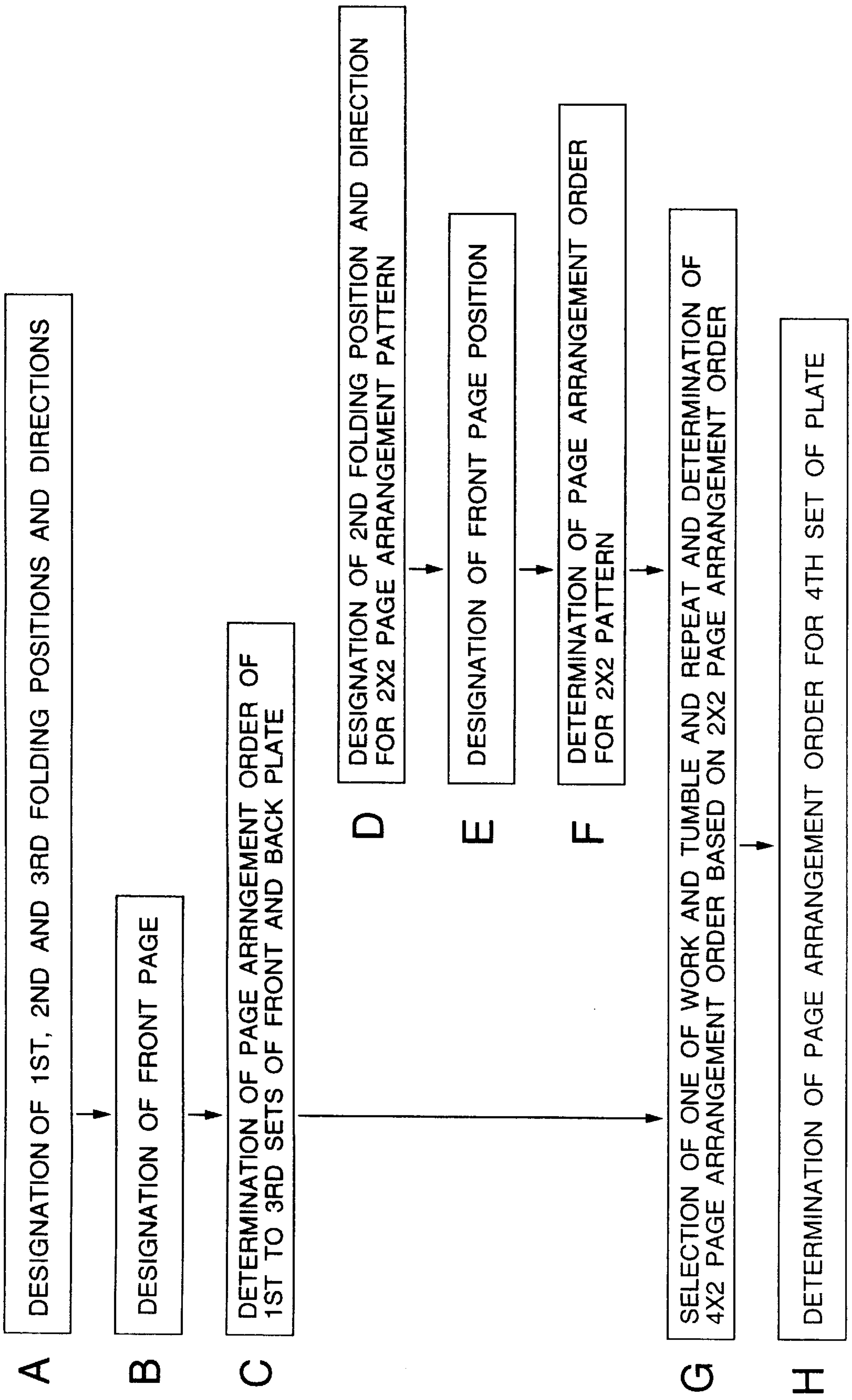
FIG.10 (PRIOR ART)
FIG. 10 is a block diagram showing a conventional process of determining the page arrangement order in the case of effecting a cutting operation.

Also, if there is cutting operation, the determination of the page arrangement order does not need to rely on the procedure or operations d, e and f of FIG. 10, in which printing paper is manually folded, page Nos. are put on the folded paper, and the folding order and directions and the front page position required after the cutting operation are additionally input. Instead, the page arrangement order can be determined merely by designating whether or not the cutting is effected and by selecting one of "the work and tumble" and "the repeat".

What is claimed is:

1. A method of determining an arrangement of a plurality of pages, which define a signature, that are reproduced on a photosensitive machine plate, comprising the steps of:

preparing a computer including a calculation program for determining the arrangement of the pages under an assumption that positions of the pages on the photosensitive machine plate are determined successively from a first page to a last page in the signature, and a position symmetrical with a page Gn with respect to a folding position Fn is determined as a page G(n+1), the calculation program calculating the relationship between positions of pages to be reproduced on the photosensitive machine plate and positions of folding Fn according to an operation procedure Pn expressed by the following formula:

$$Pn=P(n-1)\rightarrow Fn\rightarrow P(n-1)^{-1}$$

wherein, n associated with parameters G, P and F indicate positive numbers, $P(n-1)^{-1}$ indicates an inverse of P(n−1);

inputting into the computer data designating a folding order; and inputting into the computer data designating a position of the first page of the signature.

2. A method as defined in claim 1, wherein the pages expressed by the following formula A are arranged on a machine plate for a front side of a printing paper, and the pages expressed by the following formula B are arranged on a machine plate for a back side of the printing paper:

$$A=2n-(1-(-1)^n)/2$$

$$B=2n-(1+(-1)^n)/2$$

wherein, n indicates positive numbers.

3. A method as defined in claim 2, further comprising the steps of:

designating the first folding position as a cutting position;

calculating by the computer and obtaining a first arrangement of pages for a front side of the printing paper and a second arrangement of pages for a back side of the printing paper;

the first arrangement being obtained by changing the arrangement such that the arrangement for the back side of the paper located on one side of the cutting position is identical with the arrangement for the front side of the paper located on an other side of the cutting position, the second arrangement being obtained by changing the arrangement such that the page arrangement for the front side of the paper located on the other side is identical with the arrangement for the back side of the paper located on the one side.

4. A method as defined in claim 1, wherein the first folding position is a cutting position.

* * * * *